(12) United States Patent
Stares

(10) Patent No.: US 9,365,111 B2
(45) Date of Patent: Jun. 14, 2016

(54) VEHICLE AND METHOD OF CONTROLLING A VEHICLE

(75) Inventor: Pete Stares, Coventry Warwickshire (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 136 days.

(21) Appl. No.: 14/000,378

(22) PCT Filed: Feb. 20, 2012

(86) PCT No.: PCT/EP2012/052868
§ 371 (c)(1),
(2), (4) Date: Oct. 29, 2013

(87) PCT Pub. No.: WO2012/110663
PCT Pub. Date: Aug. 23, 2012

(65) Prior Publication Data
US 2014/0074368 A1    Mar. 13, 2014

(30) Foreign Application Priority Data

Feb. 18, 2011    (GB) .................................. 1102821.4

(51) Int. Cl.
*B60K 23/08*    (2006.01)
*B60K 17/34*    (2006.01)
(Continued)

(52) U.S. Cl.
CPC ................. *B60K 23/08* (2013.01); *B60K 17/34* (2013.01); *B60K 17/35* (2013.01); *B60W 10/119* (2013.01); *B60W 10/14* (2013.01); *B60W 10/16* (2013.01); *B60K 2023/0858* (2013.01); *B60W 2050/0019* (2013.01); *B60W 2050/0042* (2013.01);
(Continued)

(58) Field of Classification Search
None
See application file for complete search history.

(56) References Cited

U.S. PATENT DOCUMENTS 4,484,653 A    11/1984    Horikoshi et al.
4,961,476 A    10/1990    Witte et al.
(Continued)

FOREIGN PATENT DOCUMENTS

EP    1308338 A2    10/2004
EP    1500546 A1    1/2005
(Continued)

OTHER PUBLICATIONS

International Search Repott for PCT/EP2012/052868 dated Jul. 30, 2012, 5 pages.
(Continued)

*Primary Examiner* — John R Olszewski
*Assistant Examiner* — Gerrad A Foster
(74) *Attorney, Agent, or Firm* — Reising Ethington P.C.

(57) ABSTRACT

A vehicle having a prime mover and a driveline to connect the prime mover to first and second groups of wheels such that the first group is driven by the prime mover when the driveline is in a first mode, and the first and second groups are driven when the driveline is in a second mode. The driveline comprises an auxiliary portion comprising first and second releasable torque transmitting mechanisms and a prop shaft. The first and second torque transmitting mechanisms are respectively operable to connect the prop shaft to the prime mover and to the second group of wheels. The driveline is operable to transition to the second mode when a second condition is met that includes a vehicle operating parameter exceeding a first threshold, and to transition to the first mode when a first condition is met that includes the operating parameter being less than a second threshold.

31 Claims, 4 Drawing Sheets

(51) Int. Cl.
- *B60K 17/35* (2006.01)
- *B60W 10/119* (2012.01)
- *B60W 10/14* (2012.01)
- *B60W 10/16* (2012.01)
- *B60W 50/00* (2006.01)

(52) U.S. Cl.
CPC ...... *B60W2520/00* (2013.01); *B60W 2520/263* (2013.01); *B60W 2540/00* (2013.01); *B60W 2550/00* (2013.01); *B60W 2710/021* (2013.01); *B60W 2710/023* (2013.01)

(56) References Cited

U.S. PATENT DOCUMENTS

| | | |
|---|---|---|
| 5,802,489 A | 9/1998 | Orbach et al. |
| 6,035,988 A | 3/2000 | Ito et al. |
| 2003/0150685 A1 | 8/2003 | Iida et al. |
| 2004/0222029 A1 | 11/2004 | Shigeta et al. |
| 2008/0195288 A1 | 8/2008 | Burkhart et al. |
| 2010/0248888 A1 | 9/2010 | Hamperl et al. |

FOREIGN PATENT DOCUMENTS

| | | |
|---|---|---|
| EP | 1308336 A2 | 12/2005 |
| GB | 2407804 A | 5/2005 |
| JP | H03029091 Y2 | 8/1994 |
| JP | H10272955 A | 10/1998 |
| JP | H11157355 A | 6/1999 |
| JP | 2000326742 A | 11/2000 |
| JP | 2009166706 A | 7/2009 |
| WO | WO2011107222 A1 | 9/2011 |

OTHER PUBLICATIONS

Combined search and examination report corresponding to application No. GB1202841.1, dated Jun. 18, 2012, 6 pages.
Combined search and examination report corresponding to application No. GB1102821.4, dated Jun. 13, 2011, 6 pages.
Japanese Office action corresponding to application No. 2013-553964, dated Jun. 20, 2014, 4 pages.

VEHICLE AND METHOD OF CONTROLLING A VEHICLE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable change the number of wheels that provide torque to drive the vehicle.

BACKGROUND

It is known to provide a motor vehicle having a two wheel drive mode of operation in which motive power is supplied to one pair of wheels of the vehicle and a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select the two wheel drive or the four wheel drive mode of operation.

Some driveline systems require the vehicle to be stationary when transitioning between the two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to assume the four wheel drive mode when a prescribed condition is met and automatically to assume the two wheel drive mode when the prescribed condition is not met.

The present inventors have recognised that a problem exists with vehicles equipped with such systems. That is, rapid switching between the two wheel and four wheel drive conditions (a phenomenon that may be described as 'mode chattering') may occur when the condition for which the four wheel drive mode should be assumed is met shortly after the condition is not met.

It is an aim of embodiments of the present invention to at least partially mitigate the disadvantages of known dynamic driveline systems.

STATEMENT OF THE INVENTION

Embodiments of the invention may be understood by reference to the appended claims.

Aspects of the invention provide a motor vehicle and a method.

In a further aspect of the invention for which protection is sought there is provided a motor vehicle having:
 prime mover means;
 at least first and second groups of one or more wheels; and
 a driveline operable by means of control means to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation, the driveline being operable to connect the second group to the torque transmission path by means of an auxiliary portion comprising first and second releasable torque transmitting means and a prop shaft, the first releasable torque transmitting means being operable to connect a first end of the prop shaft to the torque transmission path, the second releasable torque transmitting means being operable to connect a second end of the prop shaft to the second group of one or more wheels, the control means being operable to control the auxiliary portion to switch the driveline between the first and second modes of operation such that in the first mode the prop shaft is disconnected from both the torque transmission path and said second group of one or more wheels, the driveline being operable to transition from the first mode to the second mode when a second mode trigger condition is met, the second mode trigger condition including the requirement that the magnitude of the value of a vehicle operating parameter of a first set of one or more vehicle operating parameters is less than or greater than a first threshold value, the driveline being further operable subsequently to transition from the second mode to the first mode when a first mode trigger condition is met, the first mode trigger condition including the requirement that the magnitude of the value of said vehicle operating parameter of the first set is greater than or less than a second threshold value, the second threshold value having a value different from the first threshold value.

Thus, if the second mode trigger condition in respect of one parameter is that the value of the parameter is greater than the first threshold value, the corresponding first mode trigger condition in respect of that one parameter is that the value of the parameter is less than a second threshold value.

Similarly, if the second mode trigger condition in respect on one parameter is that the value of the parameter is less than the first threshold value, the corresponding first mode trigger condition in respect of that one parameter is that the value of the parameter is greater than a second threshold value.

Thus a hysteresis width is present in respect of the value of the one parameter triggering a transition from the first mode to the second mode and the value triggering a transition from the second mode to the first mode. In other words, a hysteresis width or gap exists in respect of the value of the one parameter triggering a transition from the first mode to the second mode and the value triggering a transition from the second mode to the first mode.

It is to be understood that reference herein to a group of one or more wheels includes reference to a group having a membership of only one wheel.

Embodiments of the invention have the advantage that a risk that a driveline suffers mode chattering is reduced. By mode chattering is meant that the driveline transitions between the first and second modes repeatedly within a relatively short period of time. For example if a driveline is arranged to assume the first mode when the speed falls below a prescribed value and to assume the second mode when the speed rises above the same prescribed value mode chattering can occur if the vehicle speed fluctuates about the prescribed value. The speed may fluctuate about the prescribed value due to traffic conditions, or where a driver is seeking to maintain a speed that is similar to the prescribed value.

In an embodiment the first set of one or more vehicle parameters comprises a plurality of vehicle parameters and the second mode trigger condition includes the requirement that the magnitude of the value of any one of the first set of operating parameters is less than or greater than a respective first threshold value of that operating parameter, the first mode trigger condition including the requirement that the magnitude of the value of each vehicle operating parameter of the first set is greater than or less than a corresponding second threshold value of each operating parameter.

In an embodiment the vehicle is operable to transition from the second mode to the first mode only when a further requirement is met in respect of one or more further operating parameters not being parameters of the first set.

It is to be understood that in some embodiments an operating parameter that triggers a connect event being a transition from the first mode to the second mode may not be an operating parameter than can trigger a disconnect alone. Thus, disconnect may require that a condition in respect of each of one or more further operating parameters must be met before disconnect is permitted, in addition to the requirement that the value of any operating parameter that has triggered a connect event has subsequently passed through the respective second threshold value in the respective second direction.

For example, torque delivery through the driveline may be required to be less than a threshold value before disconnect can occur. The torque may be an instantaneous value of torque at the time disconnect is desired or a torque level throughout a prescribed period of time. If the condition in respect of torque delivery through the driveline is not met then the transition to the first mode will not be made until the condition is met even if the value of any operating parameter triggering the transition to the second mode has subsequently passed through the respective second threshold value in the respective second direction.

Advantageously the transition to the first mode may only be made when a disconnect delay period has elapsed.

This feature has the advantage that a 'settling period' may be provided before disconnect takes place in order to reduce a risk of mode chattering.

In an embodiment the transition to the first mode may only be made when the second mode trigger condition has not been met for a time period that is greater than the disconnect delay period.

Thus the transition from the second mode to the first mode may depend on whether a further event being an event triggering a connect event has occurred since the vehicle transitioned to the second mode from the first mode. This feature has the advantage that a risk of mode chattering is still further reduced.

Advantageously the transition to the first mode may only be made when the first mode trigger condition has been met for a time period that is greater than the disconnect delay period.

This feature has the advantage that a risk of mode chattering is still further reduced.

In an embodiment the length of the disconnect delay period is dependent on a value of at least one vehicle operating parameter.

In an embodiment the length of the disconnect delay period is dependent on an identity of the operating parameter of the first set of one or more operating parameters that triggered the transition from the first mode to the second mode of operation.

In an embodiment the disconnect delay period is responsive to the difference between the first threshold value and the magnitude of the value of the operating parameter triggering the transition to the second mode at the time the transition to the second mode was made.

This feature has the advantage that the disconnect delay period may be made adaptive to a magnitude or severity of the 'event' that triggered the driveline to assume the second mode of operation.

That is, the disconnect delay period may vary according to a parameter which may be responsive to one or more of a driving style of a user, a condition of the vehicle and an environmental condition. Other arrangements are also useful. Thus if a user exhibits an aggressive driving style resulting in an increased difference between the first threshold value and the actual value of the parameter when the second mode is assumed the disconnect delay period responds to the driving style by increasing or decreasing the disconnect delay period according to the configuration of the controller. For certain vehicle operating parameters the disconnect delay period may be increased whilst for others it may be decreased.

In an embodiment the rate of connection by the driveline of the second group of one or more wheels to the prime mover means when the transition to the second mode is made is responsive to a value of at least one operating parameter, the disconnect delay period being dependent on the rate of connection by the driveline of the second group of one or more wheels when the second group of one or more wheels was last connected.

Thus the rate of connection may also be adaptive and the disconnect delay period depend on the rate of connection.

In an embodiment the rate of connection by the driveline of the second group of one or more wheels to the prime mover means when the transition to the second mode is made is responsive to the identity of the operating parameter triggering the transition to the second mode, the disconnect delay period being dependent on the rate of connection by the driveline of the second group of one or more wheels when the transition to the second mode was made.

Optionally the disconnect delay period is arranged to increase as a function of increasing rate of connection.

Alternatively the disconnect delay period is arranged to decrease as a function of increasing rate of connection.

In an embodiment the disconnect delay period is dependent on an output of a drive style evaluator, the drive style evaluator being arranged to provide an output responsive to a driving style of a user over an evaluation time period.

In an embodiment the output of the drive style evaluator is responsive to at least one selected from amongst:
(a) an average rate of acceleration and/or deceleration of the vehicle over the evaluation time period,
(b) a peak value of rate of acceleration and/or deceleration over the evaluation time period,
(c) an instantaneous value of rate of acceleration and/or deceleration,
(d) an average value of rate of change of steering wheel position over the evaluation time period,
(e) a peak value of rate of change of steering position over the evaluation time period,
(f) an instantaneous value of rate of change of steering wheel position,
(g) an average value of rate of change of throttle position over the evaluation time period, (h) a peak value of rate of change of throttle position over the evaluation time period, (i) an instantaneous value of rate of change of throttle position, (j) an average value of torque transmitted to the second group of wheels over the evaluation time period, (k) a peak value of torque transmitted to the second group of wheels over the evaluation time period and (l) an instantaneous value of torque transmitted to the second group of wheels.

Optionally the vehicle has a plurality of driver selectable vehicle programs operable to control a performance of the vehicle, the disconnect delay period being responsive to the identity of the driver selected vehicle program.

By vehicle program is included a vehicle program arranged to change one or more of a throttle map, gear shift map, suspension response or any other suitable vehicle system or operating parameter. For example, the vehicle program may be a terrain response program such as a 'sand program', a 'grass or gravel program' a 'snow or ice program', a 'dynamic mode' program or any other suitable program.

Optionally the disconnect delay period is responsive to at least one environmental condition parameter.

In an embodiment the at least one environmental condition parameter is responsive to one selected from amongst:

(a) an ambient temperature, (b) an ambient moisture level, (c) a determination whether or not precipitation is present, (d) a determination whether a level of moisture on a driving surface exceeds a prescribed value; and (e) a determination whether an estimated coefficient of friction of the driving surface exceeds a prescribed value.

In an embodiment the second mode trigger condition includes one selected from amongst the requirements that:

(a) an instantaneous amount of torque being delivered through the driveline to one or more wheels is above a first prescribed instantaneous torque threshold, (b) a steering wheel angle is above a first prescribed steering wheel angle threshold, (c) a steerable road wheel angle is greater than a first prescribed steerable road wheel angle threshold, (d) a rate of change of steerable road wheel angle exceeds a first prescribed steerable road wheel angle rate threshold, (e) a rate of change of steering wheel angle exceeds a first prescribed steering wheel angle rate threshold, (f) a lateral acceleration of the vehicle is greater than a first prescribed lateral acceleration threshold, (g) a rate of change of lateral acceleration exceeds a first prescribed lateral acceleration rate threshold, (h) a throttle or accelerator pedal position value is greater than a first prescribed throttle or accelerator pedal position threshold, (i) a rate of change of throttle or accelerator pedal position is greater than a first prescribed throttle or accelerator pedal position rate threshold, (j) a driver demanded torque is greater than a first prescribed driver demanded torque threshold, (k) a prime mover means torque is greater than a first prescribed prime mover means torque threshold, (l) an amount of wheel slip is above a first prescribed wheel slip threshold, (m) a vehicle acceleration is greater than a first prescribed vehicle acceleration threshold, (n) a vehicle deceleration is greater than a first prescribed vehicle deceleration threshold, (o) a yaw rate of the vehicle is greater than a first prescribed yaw rate threshold, (p) a yaw rate error is greater than a first prescribed yaw rate error threshold, (q) a speed of the vehicle is below a first prescribed vehicle speed threshold, (r) an operating temperature is below a first prescribed operating temperature threshold, (s) an ambient temperature is below a first prescribed ambient temperature threshold, (t) a temperature of a vehicle component is below a first prescribed component temperature threshold, (u) a temperature of a vehicle fluid is below a first prescribed fluid temperature threshold, (v) a temperature of a component of the auxiliary driveline is below a first prescribed driveline component lower temperature threshold, (w) a temperature of a fluid of the auxiliary driveline is below a first prescribed driveline fluid lower temperature threshold, (x) a temperature of a component of the auxiliary driveline is above a first prescribed driveline component upper temperature threshold greater than the first prescribed driveline component lower temperature threshold, (y) a temperature of a fluid of the auxiliary driveline is above a first prescribed driveline fluid upper temperature threshold greater than the first prescribed driveline fluid lower temperature threshold, (z) a roughness of a driving surface is above a first prescribed surface roughness threshold, (a1) a brake pedal position value is greater than a first prescribed brake pedal position threshold, and (b1) a brake pressure value is greater than a first prescribed brake pressure threshold.

In an embodiment the corresponding first mode trigger condition requirement (a) to (b1) in respect of the second mode trigger condition requirement (a) to (b1) is that:

(a) the instantaneous amount of torque being delivered through the driveline to one or more wheels is less than a second prescribed instantaneous torque threshold less than the first threshold, (b) the steering wheel angle is below a second prescribed steering wheel angle threshold less than the first threshold, (c) the steerable road wheel angle is less than a second prescribed steerable road wheel angle threshold less than the first threshold, (d) the rate of change of steerable road wheel angle is less than a second prescribed steerable road wheel angle rate threshold less than the first threshold, (e) the rate of change of steering wheel angle is less than a second prescribed steering wheel angle rate threshold less than the first threshold, (f) the lateral acceleration of the vehicle is less than a second prescribed lateral acceleration threshold less than the first threshold, (g) the rate of change of lateral acceleration is less than a second prescribed lateral acceleration rate threshold less than the first threshold, (h) the throttle or accelerator pedal position value is less than a second prescribed throttle or accelerator pedal position threshold less than the first threshold, (i) the rate of change of throttle or accelerator pedal position is less than a second prescribed throttle or accelerator pedal position rate threshold less than the first threshold, (j) the driver demanded torque is less than a second prescribed driver demanded torque threshold less than the first threshold, (k) the prime mover means torque is less than a second prescribed prime mover means torque threshold less than the first threshold,
(l) the amount of wheel slip is less than a second prescribed wheel slip threshold less than the first threshold,
(m) the vehicle acceleration is less than a second prescribed vehicle acceleration threshold less than the first threshold,
(n) the vehicle deceleration is less than a second prescribed vehicle deceleration threshold less than the first threshold,
(o) the yaw rate of the vehicle is less than a second prescribed yaw rate threshold less than the first threshold,
(p) the yaw rate error is less than a second prescribed yaw rate error threshold less than the first threshold,
(q) the speed of the vehicle is above a second prescribed vehicle speed threshold greater than the first threshold,
(r) the operating temperature is above a second prescribed operating temperature threshold greater than the first threshold,
(s) the ambient temperature is above a second prescribed ambient temperature threshold greater than the first threshold,
(t) the temperature of the vehicle component is above a second prescribed component temperature threshold greater than the first threshold,
(u) the temperature of the vehicle fluid is above a second prescribed fluid temperature threshold greater than the first threshold,
(v) the temperature of the component of the auxiliary driveline is above a second prescribed driveline component lower temperature threshold greater than the first threshold,
(w) the temperature of the fluid of the auxiliary driveline is above a second prescribed driveline fluid lower temperature threshold greater than the first threshold,
(x) the temperature of the component of the auxiliary driveline is below a second prescribed driveline component upper temperature threshold less than the first driveline component upper temperature threshold,
(y) the temperature of the fluid of the auxiliary driveline is below a second prescribed driveline fluid upper temperature threshold less than the first prescribed driveline fluid upper temperature threshold,
(z) the roughness of the driving surface is below a second prescribed surface roughness threshold less than the first threshold,
(a1) a brake pedal position value is less than a second prescribed brake pedal position threshold less than the first threshold, and
(b1) a brake pressure value is less than a second prescribed brake pressure threshold less than the first threshold.

Advantageously the transition to the first mode may only be made when an amount of torque being delivered through the driveline to one or more wheels is below a prescribed threshold.

In an embodiment the requirement that the amount of torque being delivered through the driveline to one or more wheels is below a prescribed threshold includes the requirement that the amount of instantaneous torque being delivered through the driveline to one or more wheels is below the prescribed threshold at the time disconnect is required.

In an embodiment the requirement that the amount of torque being delivered through the driveline to one or more wheels is below a prescribed threshold includes the requirement that the amount of torque being delivered through the driveline to one or more wheels is below the prescribed threshold for a period equal to the disconnect delay period.

In an embodiment values of the first and/or second threshold values are responsive to a value of a vehicle operating temperature parameter in a manner so as to reduce a likelihood that a transition from the first mode to the second mode or the second mode to the first mode will occur when the value of the vehicle operating temperature parameter is above a first prescribed vehicle operating temperature value.

In an embodiment the vehicle operating temperature value is a temperature value of at least one selected from amongst a component or fluid of the vehicle, a component or fluid of the auxiliary portion of the driveline and a component or fluid of one or either of the releasable torque transmitting means.

In an embodiment the first group of one or more wheels comprises a first pair of wheels and the first mode corresponds to a two wheel drive mode of operation wherein only the first pair of wheels is driven by the prime mover means.

In an embodiment the second group of one or more wheels comprises a second pair of wheels and the second mode of operation corresponds to a four wheel drive mode of operation in which only the first and second pairs of wheels are driven by the prime mover means.

Alternatively the second group of one or more wheels comprises a second and a third pair of wheels and the second mode of operation corresponds to a six wheel drive mode of operation in which only the first, second and third pairs of wheels are driven by the prime mover means.

At least one of the first and second groups of one or more wheels may comprise a plurality of pairs of wheels.

The prime mover means may comprise at least one selected from amongst an engine such as an internal combustion engine such as a piston engine or a turbine engine and an electric machine.

In a further aspect of the invention for which protection is sought there is provided a method of controlling a motor vehicle driveline to transition between first and second modes of operation, in the first mode of operation a prime mover means of the vehicle being arranged to drive a first group of one or more wheels and not a second group of one or more wheels, in the second mode of operation the prime mover means being arranged to drive the first group of one or more wheels and the second group of one or more wheels, the method comprising the step of controlling the driveline to assume the second mode of operation when a second mode trigger condition is met, the second mode trigger condition including the requirement that the magnitude of the value of a vehicle operating parameter of a first set of one or more vehicle operating parameters is less than or greater than a first threshold value, the method further comprising the step of controlling the driveline to transition from the second mode to the first mode when a first mode trigger condition is met, the first mode trigger condition including the requirement that the magnitude of the value of said vehicle operating parameter of the first set is greater than or less than a second threshold value that is different from the first threshold value, the step of transitioning from the first mode to the second mode comprising the step of connecting the second group of one or more wheels to the prime mover means by connecting a first end of a prop shaft to the prime mover means by means of a first releasable torque transmitting means and connecting a second end of the prop shaft to the second group of one or more wheels by means of a second releasable torque transmitting means, the step of transitioning from the second mode to the first mode comprising the step of disconnecting the prop shaft from the prime mover means and the second group of one or more wheels.

In a further aspect of the invention for which protection is sought there is provided a motor vehicle having: a prime mover; at least first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary driveline comprising releasable torque transmitting means operable to connect and disconnect the second group of one or more wheels from the prime mover when the driveline transitions between the first mode and the second mode, the vehicle having means for determining a value of at least one vehicle operating parameter and means for storing first and second threshold values of said at least one vehicle operating parameter, the first and second threshold values being different from one another, the vehicle being operable to transition from the first mode to the second mode when the condition is met that the value of one said at least one vehicle operating parameter passes through the first threshold value in a first direction away from the second threshold value, the vehicle being further operable subsequently to transition from the second mode to the first mode when the condition is met that the value of the one said at least one vehicle operating parameter passes through the second threshold value in a second direction opposite the first direction, thereby to reduce a likelihood of mode chattering.

It is to be understood that reference to passing through threshold values in respective directions is due to the fact that the transition from the first mode to the second mode may occur when a value of a parameter falls below a first threshold value (e.g. speed falls below a first speed threshold value) or when a value of a parameter rises above a first threshold value (e.g. lateral acceleration rises above a first lateral acceleration threshold value).

Preferably the vehicle is operable to transition from the first mode to the second mode when the condition is met that the value of any one of a plurality of vehicle operating parameters passes through a respective first threshold value corresponding to that operating parameter in a respective first direction away from a second respective threshold value, the vehicle being operable subsequently to transition from the second mode to the first mode when the condition is met that the value of each vehicle operating parameter that has passed through its respective first threshold value in the respective first direction has subsequently passed through its respective second threshold value in a second respective direction opposite the first respective direction.

Preferably the transition back to the first mode may be made only when one or more conditions in respect of one or more further operating parameters are also met.

Preferably the transition to the first mode may only be made when a disconnect delay period has elapsed.

The prime mover may comprise at least one of an internal combustion engine and an electric machine.

In another aspect of the invention there is provided a method of controlling a motor vehicle to transition between first and second modes of operation, in the first mode of operation a prime mover of the vehicle being arranged to drive a first group of one or more wheels and in the second mode of operation the prime mover being arranged to drive the first group of one or more wheels and a second group of one or more wheels, the method comprising the step of determining a value of at least one vehicle operating parameter and controlling the vehicle to assume the second mode of operation when the condition is met that the value of one said at least one vehicle operating parameter passes through a first threshold value in a first direction away from a second threshold value, and subsequently controlling the vehicle to transition from the second mode to the first mode when the condition is met that the value of the one said at least one vehicle operating parameter passes through the second threshold value in a second direction opposite the first direction, thereby to reduce a likelihood of mode chattering.

In one aspect of the invention for which protection is sought there is provided a motor vehicle having:
  prime mover means;
  at least first and second groups of one or more wheels; and
  a driveline to connect the prime mover means to the first and second groups of one or more wheels such that the first group of one or more wheels and not the second group is driven by the prime mover means when the driveline is in a first mode of operation and the first and second groups of one or more wheels are driven by the prime mover means when the driveline is in a second mode of operation,
  the driveline comprising an auxiliary portion comprising a first releasable torque transmitting means, a prop shaft and a second releasable torque transmitting means, the first releasable torque transmitting means being operable to connect a first end of the prop shaft to the prime mover means, the second releasable torque transmitting means being operable to connect a second end of the prop shaft to the second group of one or more wheels,
  the vehicle further comprising control means operable to control the first and second torque transmitting means to switch the driveline between the first and second modes of operation such that in the first mode the prop shaft is disconnected from both the prime mover means and the second group of one or more wheels,
  the driveline being operable to transition from the first mode to the second mode when a second mode trigger condition is met, the second mode trigger condition including the requirement that the magnitude of the value of a vehicle operating parameter of a first set of one or more vehicle operating parameters exceeds a first threshold value,
  the driveline being further operable subsequently to transition from the second mode to the first mode when a first mode trigger condition is met, the first mode trigger condition including the requirement that the magnitude of the value of said vehicle operating parameter of the first set is less than a second threshold value, the second threshold value having a value different from the first threshold value.

In a further aspect of the invention for which protection is sought there is provided a motor vehicle having:
  prime mover means;
  at least first and second groups of one or more wheels; and
  a driveline to connect the prime mover means to the first and second groups of one or more wheels such that the first group of one or more wheels and not the second group is driven by the prime mover means when the driveline is in a first mode of operation and the first and second groups of one or more wheels are driven by the prime mover means when the driveline is in a second mode of operation,
  the driveline comprising an auxiliary portion comprising a first releasable torque transmitting means, a prop shaft and a second releasable torque transmitting means, the first releasable torque transmitting means being operable to connect a first end of the prop shaft to the prime mover means, the second releasable torque transmitting means being operable to connect a second end of the prop shaft to the second group of one or more wheels, the vehicle further comprising control means operable to control the first and second torque transmitting means to switch the driveline between the first and second modes of operation such that in the first mode the prop shaft is disconnected from both the prime mover means and the second group of one or more wheels, the driveline being operable to transition from the first mode to the second mode when a second mode trigger condition is met, the second mode trigger condition including the requirement that the magnitude of the value of a vehicle operating parameter of a first set of one or more vehicle operating parameters is substantially equal to a first threshold value, the driveline being further operable subsequently to transition from the second mode to the first mode when a first mode trigger condition is met, the first mode trigger condition including the requirement that the magnitude of the value of said vehicle operating parameter of the first set is substantially equal to a second threshold value, the second threshold value having a value different from the first threshold value.

It will be appreciated by those having ordinary skill in the art that the releasable torque transmitting means described herein may comprise a clutch, such as, for example and without limitation, one or more of these clutches described elsewhere herein.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
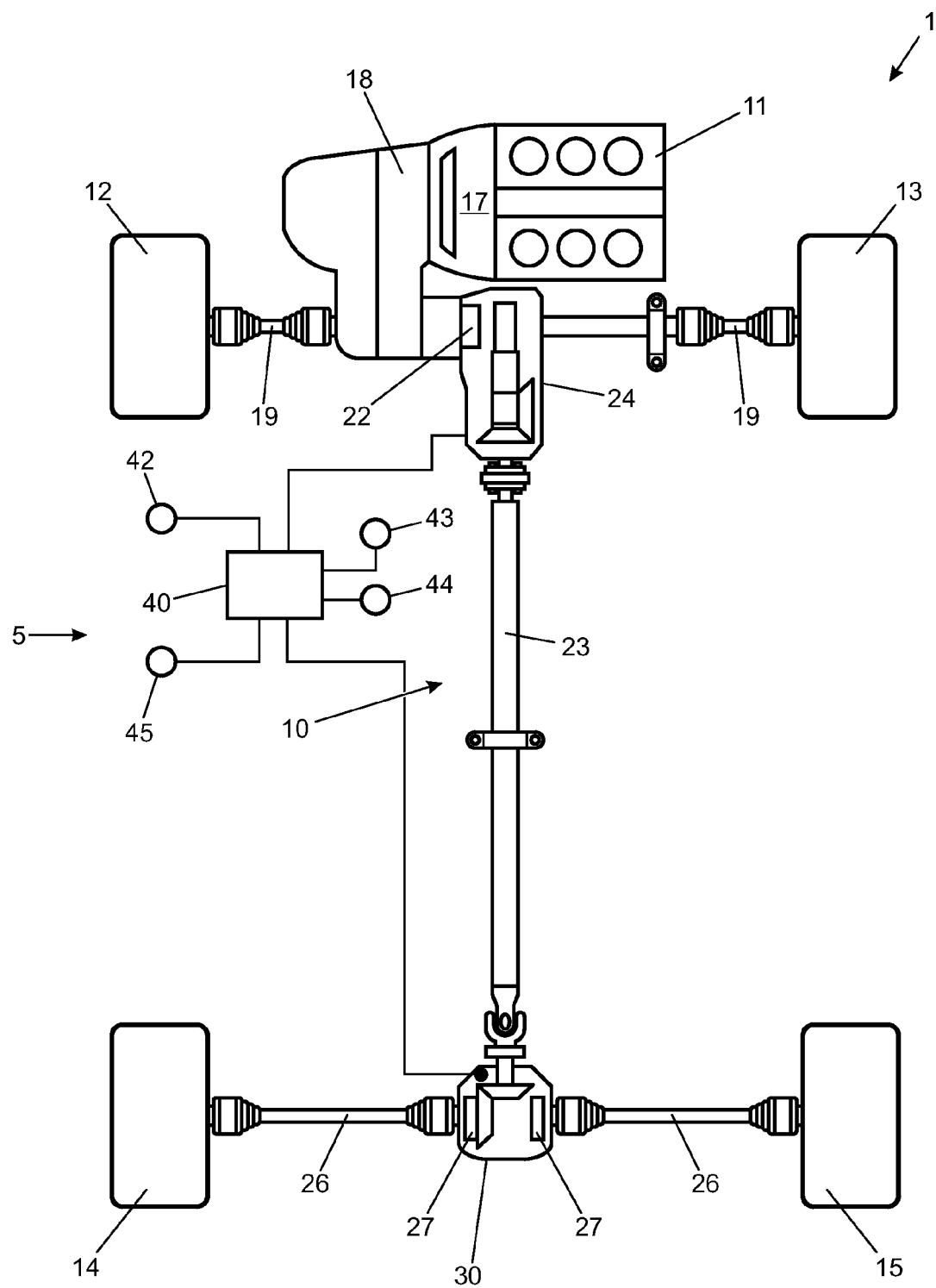
FIG. 1 is a schematic illustration of a vehicle according to an embodiment of the present invention.

A powertrain of a motor vehicle 1 according to an embodiment of the present invention is illustrated schematically in FIG. 1. The vehicle 1 has a driveline 5 connected to a prime mover in the form of an internal combustion engine 11 by means of a gear box 18, and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17, a gearbox 18 and a pair of front drive shafts 19.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18. The prop shaft 23 is coupled in turn to a rear differential 30 operable to couple the prop shaft 23 to the rear drive shafts 26.

The rear differential 30 has a pair of clutches 27 by means of which the rear differential 30 is operable to connect the prop shaft 23 to the rear drive shafts 26 when the four wheel drive mode of operation is required.

The driveline 5 has a controller 40 arranged to control operation of the PTU 24 and clutches 27. When a four wheel drive mode of operation is required the controller 40 is arranged to close the PTC 22 and to close clutches 27 of the differential 27.

The controller 40 also has a temperature sensor 42 arranged to measure an ambient temperature T being a temperature of the environment in which the vehicle 1 is operating.

In some alternative embodiments the controller 40 is arranged to receive data indicative of the ambient temperature T, for example by means of another electronic control unit (ECU) such as an engine management system. In some embodiments the controller 40 is arranged to receive the data by means of a controller area network (CAN) bus.

In the embodiment of FIG. 1 the driveline 5 may be configured to transition from a two wheel drive mode to a four wheel drive mode in which the PTC 22 and the differential clutches 27 are closed according to the state $S_{ds}$ of a driver-operable switch 45. However the driver operable switch may be over-ridden by the controller 40 under certain circumstances. Thus the actual state $S_a$ of the driveline 5 may differ from the driver-selected state $S_{ds}$. State '$S_a=0$' corresponds to the first mode of operation and state '$S_a=1$' corresponds to the second mode of operation.

In some alternative embodiments the driver-operable switch 45 may be replaced by an alternative control input, such as an input from a vehicle controller arranged to run a vehicle program that determines which mode the vehicle should assume at a given moment in time. This vehicle controller may be a separate physical controller, or a software program run by controller 40.

The vehicle program may be one of a plurality of driver selectable vehicle programs operable to control a performance of the vehicle. A vehicle program may be a program arranged to change one or more of a throttle map, gear shift map, suspension response setting or map, or any other suitable vehicle system or operating parameter. For example, the vehicle program may be one of a plurality of terrain response programs such as a 'sand program', a 'grass or gravel program' a 'snow or ice program', a 'dynamic mode' program or any other suitable program.

Figure 2:
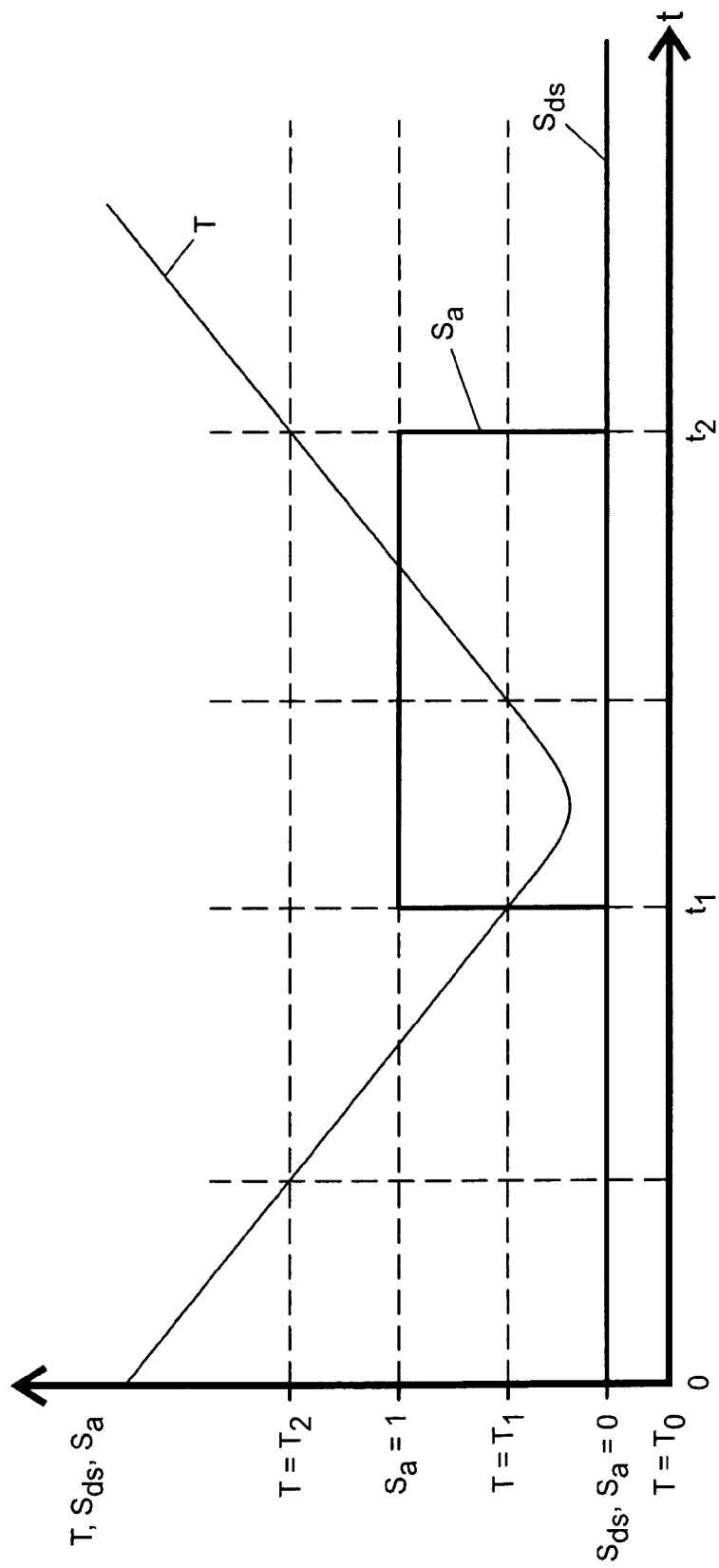
FIG. 2 is a plot of actual and driver-selected driveline states $S_a$, $S_{ds}$ respectively and ambient temperature T as a function of time during an example drive cycle in a vehicle according to an embodiment of the invention.

Operation of a driveline 5 according to the embodiment of FIG. 1 is illustrated by the plots of FIG. 2. The plots show a driver selected state $S_{ds}$ of the driveline 5 and an actual state $S_a$ of the driveline 5 as a function of time as an ambient temperature T to which the driveline 5 was exposed fell from a temperature above $T_2$ to a temperature below $T_1$ and then rose back to a temperature above $T_2$.

As shown in FIG. 2, with operational mode switch 45 set to two wheel drive operation as the ambient temperature T falls below threshold temperature $T_1$ the controller 40 controls the driveline 5 automatically to transition to the four wheel drive mode of operation ($S_a$=1). That is, when the temperature T falls below $T_1$ the controller 40 generates a signal to close the PTC 22 and clutches 27.

The driveline 5 is configured to return to the two wheel drive mode ($S_a$=0) from the four wheel drive mode when the temperature T measured by the temperature sensor 42 exceeds a second threshold $T_2$. In the embodiment shown $T_2$ is greater than $T_1$. In some embodiments $T_1$ may be around −20° C. and $T_2$ may be around −10° C. Other temperatures are also useful.

Thus, at least one further condition must be met (i.e. that the temperature is above $T_2$) in addition to the condition that the temperature is not below $T_1$ before disconnection of the rear wheels 14, 15 from the engine 11 occurs and the two wheel drive mode is resumed.

In some embodiments the controller 40 is configured to control the PTC 22 and differential clutches 27 to transition from four wheel drive to two wheel drive mode when a prescribed time period $t_p$ has elapsed after the temperature T has risen above $T_2$. This period may also be referred to as a 'disconnect delay' period.

Thus the conditions that the ambient temperature is above $T_2$ and that the ambient temperature has been above $T_2$ for at least the disconnect delay period must be met before the vehicle transitions to two wheel drive operation.

Figure 3:
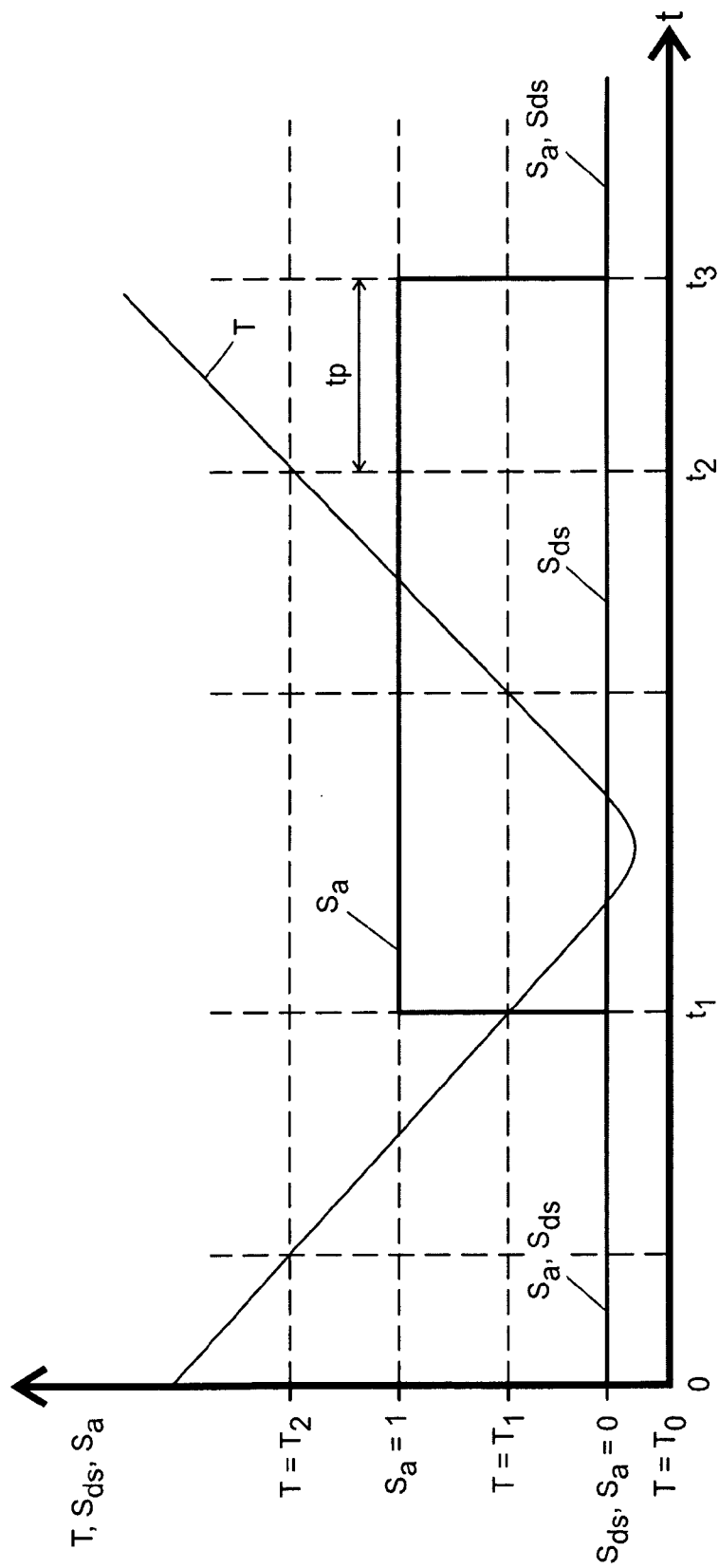
FIG. 3 is a plot of actual and driver-selected driveline states $S_a$, $S_{ds}$ respectively and ambient temperature T as a function of time during an example drive cycle in a vehicle according to a further embodiment of the invention.

FIG. 3 is a plot of temperature T, $S_{ds}$ and $S_a$ as a function of time t for a scenario similar to that of FIG. 2 for a driveline 5 having this further requirement in respect of time period $t_p$.

As in the case of the plot of FIG. 2, the driver-selected state $S_{ds}$ of the driveline 5 was set to zero ($S_{ds}$=0) corresponding to two wheel drive operation throughout the period illustrated in FIG. 3. Thus, at time t=0 when temperature T was greater than $T_2$ the actual state $S_a$ of the driveline 5 was set to the driver selected state $S_{ds}$=0.

From time t=$t_1$ the driveline 5 experienced an ambient temperature T<$T_1$. The actual state $S_a$ of the driveline was therefore set to 1 corresponding to the four wheel drive mode of operation. Thus the controller 40 controlled the PTC 22 and differential clutches 27 to transition the driveline 5 from two wheel drive to four wheel drive operation.

From time $t_2$ the driveline 5 experienced a temperature T>$T_2$. At time $t_2$ the controller began timing the period for which T>$T_2$. Once this period exceeded the disconnect delay period $t_p$ the actual state of the driveline $S_a$ was set to the driver selected state $S_{ds}$, i.e. to zero in the embodiment shown.

Thus, at time t=$t_3$ the controller opened the PTC 22 and differential clutches 27 to transition the driveline 5 from the four wheel drive to the two wheel drive mode.

It is to be understood that other arrangements in respect of operation of the driveline 5 are also useful For example, other conditions may be specified for which a transition between two and four wheel drive operation is to be made in addition to or instead of that described above in respect of ambient temperature.

For example, in some embodiments the controller 40 is arranged to receive data corresponding to a temperature of lubricant (such as an oil) in the PTU 24 and/or rear differential 30 rather than ambient temperature. Thus, in the event that a vehicle is travelling in the two wheel drive mode on a dry motorway in low ambient temperatures, where permanent four wheel drive is not required because the vehicle is on dry road, the controller 40 controls the auxiliary portion 10 to maintain the lubricant temperature above a prescribed value by temporarily engaging four wheel drive. Thus if the lubricant temperature falls below the first threshold value the controller engages four wheel drive until the lubricant temperature rises above the second threshold value, when the two wheel drive mode is again assumed.

If the temperature of the lubricant subsequently falls below the first threshold value again, the controller 40 re-engages four wheel drive as described above. Thus the operator of the vehicle is able to enjoy improved fuel economy due to the fact that four wheel drive is not permanently engaged. At the same time the operator enjoys the benefit that should it become necessary to assume the four wheel drive mode the lubricant associated with the auxiliary portion 10 is at a temperature that will not cause excessive wear of the components if four wheel drive is suddenly engaged. Furthermore the time taken to effect engagement will not be unacceptably long due to low temperature (and increased viscosity) of the lubricant.

In some embodiments the controller 40 is arranged to control the driveline 5 to transition between two wheel drive and four wheel drive operation according to a speed of the vehicle. Other operating parameters are also useful in addition to or instead of temperature and speed.

It is to be understood that the specific arrangements of gears and clutches of the driveline 5 may differ in some embodiments of the invention.

Figure 4:
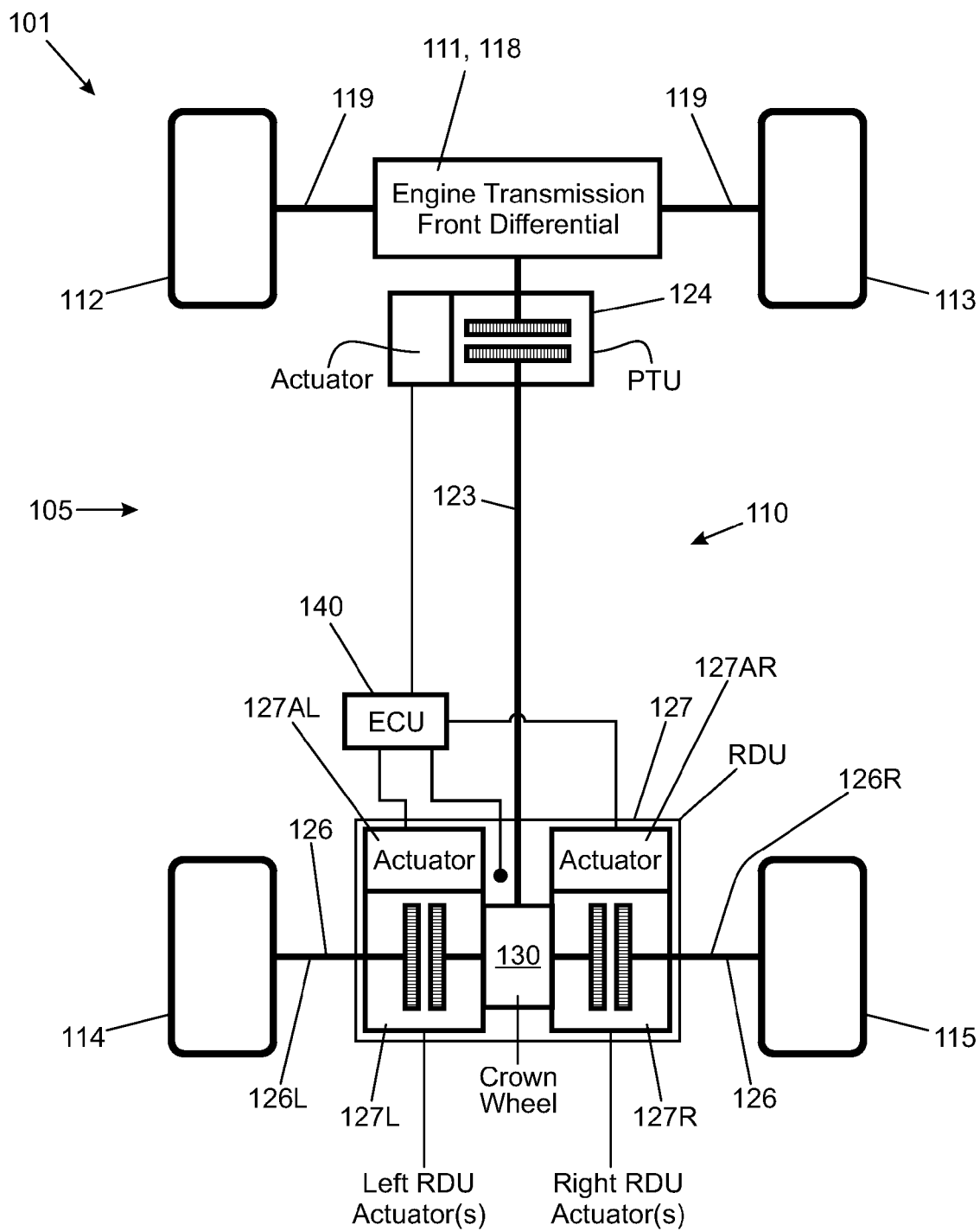
FIG. 4 is a schematic illustration of a vehicle according to a further embodiment of the invention having a rear drive unit (RDU).

FIG. 4 shows a driveline 105 of a vehicle 101 according to a further embodiment of the invention. Like features of the embodiment of FIG. 4 to those of FIG. 1 are provided with like reference signs prefixed numeral 1.

The embodiment of FIG. 4 is similar to that of FIG. 1 in that driveline 105 has a power transfer unit (PTU) 124 (sometimes referred to as a power take off unit) operable to connect one end of a prop shaft 123 of an auxiliary portion 110 of the driveline 105 to the engine 111 via the transmission 118.

However, instead of a rear differential 30, the auxiliary portion 110 of the driveline 105 has a rear drive unit (RDU) 127. In the embodiment of FIG. 4 the RDU 127 has a crown wheel 130 coupled to an end of the prop shaft 123 opposite the end of the prop shaft 123 that is connected to the PTU 124.

The RDU 127 also has a pair of friction clutches 127L, 127R operable to couple the crown wheel 130 to left and right rear drive shafts 126L, 126R, respectively.

The RDU 127 is provided with left and right actuators 127AL, 127AR respectively operable to open and close the left and right friction clutches 127L, 127R respectively. The actuators 127AL, 127AR are arranged such that as the actuators 127AL, 127AR move from a first position in which both friction clutches 127L, 127R are open towards a second position in which both friction clutches 127L, 127R are closed, pressure is applied to the respective friction clutches 127L, 127R thereby to close the friction clutches 127L, 127R.

It is to be understood that embodiments of the invention have the advantage that a hysteresis may be introduced in respect of the operational state of the driveline 5, 105. The introduction of hysteresis in the operational state is arranged to reduce a risk of multiple switching operations between the two wheel and four wheel drive modes of operation (mode chattering) by making the conditions for selecting each of the modes sufficiently different to avoid mode chattering.

The controller 40, 140 may also receive other signals corresponding to vehicle operating parameters. For example signals may be received from a vehicle controller such as a vehicle electronic control unit (ECU), e.g. an antilock braking system (ABS) controller and/or directly from sensors 43, 44 (FIG. 1).

Such signals may include but are not restricted to engine temperature, a driveline temperature such as a driveline fluid temperature (e.g. lubricant or coolant), engine speed, engine torque output, one or more wheel speeds, the identity of a selected gear or vehicle operating program, throttle angle, measurements of a longitudinal and/or lateral acceleration by means of a vehicle accelerometer, yaw rate, etc. Signals derived from measurements made by sensors but calculated by a controller may also be used, such as yaw rate error which may be derived by comparing an actual value of yaw rate as measured by a yaw rate sensor with an expected yaw rate, the latter being derived from one or more other signals such as steering angle and vehicle speed.

In some embodiments the length of the disconnect delay period may be responsive to the value of one or more vehicle parameters.

The controller 40 may be arranged to utilise the signals to detect various vehicle operating conditions such as a) frost conditions using ambient temperature, b) driving styles using rate of steering e.g. steering or road wheel angle and rate of throttle such as throttle position, or rate of change of steering or road wheel angle or throttle position, c) low friction surfaces detected through steering angle, speed, throttle maps, lateral acceleration forces, d) gradient as detected using throttle maps, speed and velocity change, e) towing (detected as per 'd)' above), and f) wheel spin detected for example by comparing vehicle speed with individual wheel speeds.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1102821.4 filed 18 Feb. 2011, the entire contents of which are expressly incorporated by reference herein.

The invention claimed is:

1. A motor vehicle having:
a prime mover;
at least first and second groups of one or more wheels; and
a driveline operable by means of a controller to connect a torque transmission path from the prime mover to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being operable to connect the second group to the torque transmission path by means of an auxiliary portion comprising first and second releasable torque transmitting means and a prop shaft, the first releasable torque transmitting means being operable to connect a first end of the prop shaft to the torque transmission path, the second releasable torque transmitting means being operable to connect a second end of the prop shaft to the second group of one or more wheels,
the controller being operable to control the auxiliary portion to switch the driveline between the first and second modes of operation such that in the first mode the prop shaft is disconnected from both the torque transmission path and the second group of one or more wheels,
the driveline being operable to transition from the first mode to the second mode when a second mode trigger condition is met, the second mode trigger condition including the requirement that a magnitude of a value of a vehicle operating parameter of a first set of one or more vehicle operating parameters is less than or greater than a first threshold value,
the driveline being further operable subsequently to transition from the second mode to the first mode when a first mode trigger condition is met, the first mode trigger condition including the requirement that the magnitude of the value of the vehicle operating parameter of the first set is greater than or less than a second threshold value, the second threshold value having a value different from the first threshold value.

2. The motor vehicle as claimed in claim 1 wherein the first set of one or more vehicle parameters comprises a plurality of vehicle parameters and the second mode trigger condition includes the requirement that the magnitude of the value of any one of the first set of operating parameters is less than or greater than a respective first threshold value of that operating parameter,
the first mode trigger condition including the requirement that the magnitude of the value of each vehicle operating parameter of the first set is greater than or less than a corresponding second threshold value of each operating parameter.

3. The motor vehicle as claimed in claim 1 wherein the vehicle is operable to transition from the second mode to the first mode only when a further requirement is met in respect of one or more further operating parameters not being parameters of the first set.

4. The motor vehicle as claimed in claim 1 wherein the transition to the first mode may only be made when a disconnect delay period has elapsed.

5. The motor vehicle as claimed in claim 4 wherein the transition to the first mode may only be made when the second mode trigger condition has not been met for a time period that is greater than the disconnect delay period.

6. The motor vehicle as claimed in claim 4 wherein the transition to the first mode may only be made when the first mode trigger condition has been met for a time period that is greater than the disconnect delay period.

7. The motor vehicle as claimed in claim 4 wherein a length of the disconnect delay period is dependent on a value of at least one vehicle operating parameter.

8. The motor vehicle as claimed in claim 4 wherein a length of the disconnect delay period is dependent on an identity of the operating parameter of the first set of one or more operating parameters that triggered the transition from the first mode to the second mode of operation.

9. The motor vehicle as claimed in claim 4 wherein the disconnect delay period is responsive to a difference between the first threshold value and the magnitude of the value of the operating parameter triggering the transition to the second mode at a time the transition to the second mode was made.

10. The motor vehicle as claimed in claim 4 wherein a rate of connection by the driveline of the second group of one or more wheels to the prime mover when the transition to the second mode is responsive to a value of at least one operating parameter, the disconnect delay period being dependent on the rate of connection by the driveline of the second group of one or more wheels when the second group of one or more wheels was last connected.

11. The motor vehicle as claimed in claim 4 wherein a rate of connection by the driveline of the second group of one or more wheels to the prime mover when the transition to the second mode is responsive to the identity of the operating parameter triggering the transition to the second mode, the disconnect delay period being dependent on the rate of connection by the driveline of the second group of one or more wheels when the transition to the second mode was made.

12. The motor vehicle as claimed in claim 10 wherein the disconnect delay period is arranged to increase as a function of increasing rate of connection.

13. The motor vehicle as claimed in claim 10 wherein the disconnect delay period is arranged to decrease as a function of increasing rate of connection.

14. The motor vehicle as claimed in claim 4 wherein the disconnect delay period is dependent on an output of a drive style evaluator, the drive style evaluator being arranged to provide an output responsive to a driving style of a user over an evaluation time period.

15. The motor vehicle as claimed in claim 14 wherein the output of the drive style evaluator is responsive to at least one of:
 (a) an average rate of acceleration and/or deceleration of the vehicle over the evaluation time period,
 (b) a peak value of rate of acceleration and/or deceleration over the evaluation time period,
 (c) an instantaneous value of rate of acceleration and/or deceleration,
 (d) an average value of rate of change of steering wheel position over the evaluation time period,
 (e) a peak value of rate of change of steering position over the evaluation time period,
 (f) an instantaneous value of rate of change of steering wheel position,
 (g) an average value of rate of change of throttle position over the evaluation time period,
 (h) a peak value of rate of change of throttle position over the evaluation time period,
 (i) an instantaneous value of rate of change of throttle position,
 (j) an average value of torque transmitted to the second group of wheels over the evaluation time period,
 (k) a peak value of torque transmitted to the second group of wheels over the evaluation time period and
 (l) an instantaneous value of torque transmitted to the second group of wheels.

16. The motor vehicle as claimed in claim 4 wherein the vehicle has a plurality of driver selectable vehicle programs operable to control a performance of the vehicle, the disconnect delay period being responsive to an identity of the driver selected vehicle program.

17. The motor vehicle as claimed in claim 4 wherein the disconnect delay period is responsive to at least one environmental condition parameter.

18. The motor vehicle as claimed in claim 17 wherein the at least one environmental condition parameter is responsive to one of:
 (a) an ambient temperature,
 (b) an ambient moisture level,
 (c) a determination whether or not precipitation is present,
 (d) a determination whether a level of moisture on a driving surface exceeds a prescribed value; and
 (e) a determination whether an estimated coefficient of friction of the driving surface exceeds a prescribed value.

19. The motor vehicle as claimed in claim 1 wherein the second mode trigger condition includes at least one requirement selected from:
 (a) an instantaneous amount of torque being delivered through the driveline to one or more wheels is above a first prescribed instantaneous torque threshold,
 (b) a steering wheel angle is above a first prescribed steering wheel angle threshold,
 (c) a steerable road wheel angle is greater than a first prescribed steerable road wheel angle threshold,
 (d) a rate of change of steerable road wheel angle exceeds a first prescribed steerable road wheel angle rate threshold,
 (e) a rate of change of steering wheel angle exceeds a first prescribed steering wheel angle rate threshold,
 (f) a lateral acceleration of the vehicle is greater than a first prescribed lateral acceleration threshold,
 (g) a rate of change of lateral acceleration exceeds a first prescribed lateral acceleration rate threshold,
 (h) a throttle or accelerator pedal position value is greater than a first prescribed throttle or accelerator pedal position threshold,
 (i) a rate of change of throttle or accelerator pedal position is greater than a first prescribed throttle or accelerator pedal position rate threshold,
 (j) a driver demanded torque is greater than a first prescribed driver demanded torque threshold,
 (k) a prime mover torque is greater than a first prescribed prime mover torque threshold,
 (l) an amount of wheel slip is above a first prescribed wheel slip threshold,
 (m) a vehicle acceleration is greater than a first prescribed vehicle acceleration threshold,
 (n) a vehicle deceleration is greater than a first prescribed vehicle deceleration threshold,
 (o) a yaw rate of the vehicle is greater than a first prescribed yaw rate threshold,
 (p) a yaw rate error is greater than a first prescribed yaw rate error threshold,
 (q) a speed of the vehicle is below a first prescribed vehicle speed threshold,
 (r) an operating temperature is below a first prescribed operating temperature threshold,
 (s) an ambient temperature is below a first prescribed ambient temperature threshold,
 (t) a temperature of a vehicle component is below a first prescribed component temperature threshold,
 (u) a temperature of a vehicle fluid is below a first prescribed fluid temperature threshold,
 (v) a temperature of a component of the auxiliary portion is below a first prescribed driveline component lower temperature threshold,
 (w) a temperature of a fluid of the auxiliary portion is below a first prescribed driveline fluid lower temperature threshold,
 (x) a temperature of a component of the auxiliary portion is above a first prescribed driveline component upper temperature threshold greater than the first prescribed driveline component lower temperature threshold,
 (y) a temperature of a fluid of the auxiliary portion is above a first prescribed driveline fluid upper temperature threshold greater than the first prescribed driveline fluid lower temperature threshold,
(z) a roughness of a driving surface is above a first prescribed surface roughness threshold,
(a1) a brake pedal position value is greater than a first prescribed brake pedal position threshold, and
(b1) a brake pressure value is greater than a first prescribed brake pressure threshold.

20. The motor vehicle as claimed in claim 19 wherein the corresponding first mode trigger condition requirement (a) to (b1) in respect of the second mode trigger condition requirement (a) to (b1) is that:
(a) the instantaneous amount of torque being delivered through the driveline to one or more wheels is less than a second prescribed instantaneous torque threshold less than the first threshold,
(b) the steering wheel angle is below a second prescribed steering wheel angle threshold less than the first threshold,
(c) the steerable road wheel angle is less than a second prescribed steerable road wheel angle threshold less than the first threshold,
(d) the rate of change of steerable road wheel angle is less than a second prescribed steerable road wheel angle rate threshold less than the first threshold,
(e) the rate of change of steering wheel angle is less than a second prescribed steering wheel angle rate threshold less than the first threshold,
(f) the lateral acceleration of the vehicle is less than a second prescribed lateral acceleration threshold less than the first threshold,
(g) the rate of change of lateral acceleration is less than a second prescribed lateral acceleration rate threshold less than the first threshold,
(h) the throttle or accelerator pedal position value is less than a second prescribed throttle or accelerator pedal position threshold less than the first threshold,
(i) the rate of change of throttle or accelerator pedal position is less than a second prescribed throttle or accelerator pedal position rate threshold less than the first threshold,
(j) the driver demanded torque is less than a second prescribed driver demanded torque threshold less than the first threshold,
(k) the prime mover torque is less than a second prescribed prime mover torque threshold less than the first threshold,
(l) the amount of wheel slip is less than a second prescribed wheel slip threshold less than the first threshold,
(m) the vehicle acceleration is less than a second prescribed vehicle acceleration threshold less than the first threshold,
(n) the vehicle deceleration is less than a second prescribed vehicle deceleration threshold less than the first threshold,
(o) the yaw rate of the vehicle is less than a second prescribed yaw rate threshold less than the first threshold,
(p) the yaw rate error is less than a second prescribed yaw rate error threshold less than the first threshold,
(q) the speed of the vehicle is above a second prescribed vehicle speed threshold greater than the first threshold,
(r) the operating temperature is above a second prescribed operating temperature threshold greater than the first threshold,
(s) the ambient temperature is above a second prescribed ambient temperature threshold greater than the first threshold,
(t) the temperature of the vehicle component is above a second prescribed component temperature threshold greater than the first threshold,
(u) the temperature of the vehicle fluid is above a second prescribed fluid temperature threshold greater than the first threshold,
(v) the temperature of the component of the auxiliary portion is above a second prescribed driveline component lower temperature threshold greater than the first threshold,
(w) the temperature of the fluid of the auxiliary portion is above a second prescribed driveline fluid lower temperature threshold greater than the first threshold,
(x) the temperature of the component of the auxiliary portion is below a second prescribed driveline component upper temperature threshold less than the first driveline component upper temperature threshold,
(y) the temperature of the fluid of the auxiliary portion is below a second prescribed driveline fluid upper temperature threshold less than the first prescribed driveline fluid upper temperature threshold,
(z) the roughness of the driving surface is below a second prescribed surface roughness threshold less than the first threshold,
(a1) a brake pedal position value is less than a second prescribed brake pedal position threshold less than the first threshold, and
(b1) a brake pressure value is less than a second prescribed brake pressure threshold less than the first threshold.

21. The motor vehicle as claimed in claim 4 wherein the transition to the first mode may only be made when an amount of torque being delivered through the driveline to one or more wheels is below a prescribed threshold.

22. The motor vehicle as claimed in claim 21 wherein the requirement that the amount of torque being delivered through the driveline to one or more wheels is below a prescribed threshold includes the requirement that an amount of instantaneous torque being delivered through the driveline to one or more wheels is below the prescribed threshold at the time disconnect is required.

23. The motor vehicle as claimed in claim 21 wherein the requirement that the amount of torque being delivered through the driveline to one or more wheels is below a prescribed threshold includes the requirement that the amount of torque being delivered through the driveline to one or more wheels is below the prescribed threshold for a period equal to the disconnect delay period.

24. The motor vehicle as claimed in claim 1 wherein values of the first and/or second threshold values are responsive to a value of a vehicle operating temperature parameter in a manner so as to reduce a likelihood that a transition from the first mode to the second mode or the second mode to the first mode will occur when the value of the vehicle operating temperature parameter is above a first prescribed vehicle operating temperature value.

25. The motor vehicle as claimed in claim 24 wherein the vehicle operating temperature value is a temperature value of at least one selected from: a component or fluid of the vehicle, a component or fluid of the auxiliary portion of the driveline; and a component or fluid of one or either of the releasable torque transmitting means.

26. The motor vehicle as claimed in claim 1 wherein the first group of one or more wheels comprises a first pair of wheels and the first mode corresponds to a two wheel drive mode of operation wherein only the first pair of wheels is driven by the prime mover.

27. The motor vehicle as claimed in claim 1 wherein the second group of one or more wheels comprises a second pair of wheels and the second mode of operation corresponds to a four wheel drive mode of operation in which only the first and second pairs of wheels are driven by the prime mover.

28. The motor vehicle as claimed in claim 26 wherein the second group of one or more wheels comprises a second and a third pair of wheels and the second mode of operation corresponds to a six wheel drive mode of operation in which only the first, second and third pairs of wheels are driven by the prime mover.

29. The motor vehicle as claimed in claim 1 wherein at least one of the first and second groups of one or more wheels comprises a plurality of pairs of wheels.

30. A method of controlling a motor vehicle driveline to transition between first and second modes of operation, in the first mode of operation a prime mover of the vehicle being arranged to drive a first group of one or more wheels and not a second group of one or more wheels, in the second mode of operation the prime mover being arranged to drive the first group of one or more wheels and the second group of one or more wheels, the method comprising the step of controlling the driveline to assume the second mode of operation when a second mode trigger condition is met, the second mode trigger condition including the requirement that a magnitude of a value of a value of a vehicle operating parameter of a first set of one or more vehicle operating parameters is less than or greater than a first threshold value, the method further comprising the step of controlling the driveline to transition from the second mode to the first mode when a first mode trigger condition is met, the first mode trigger condition including the requirement that the magnitude of the value of the vehicle operating parameter of the first set is greater than or less than a second threshold value that is different from the first threshold value, the step of transitioning from the first mode to the second mode comprising the step of connecting the second group of one or more wheels to the prime mover by connecting a first end of a prop shaft to the prime mover by means of a first releasable torque transmitting means and connecting a second end of the prop shaft to the second group of one or more wheels by means of a second releasable torque transmitting means, the step of transitioning from the second mode to the first mode comprising the step of disconnecting the prop shaft from the prime mover and the second group of one or more wheels.

31. A system for a vehicle having a driveline comprising a prime mover, at least a pair of rear wheels, a shaft for connecting the prime mover to the rear wheels and first and second torque transmitting means for selectively connecting the prop shaft to the prime mover and to the rear wheels, respectively, the system comprising a controller configured to control operation of the first and second torque transmitting means in one of a first mode of operation, in which the prop shaft is disconnected from both the prime mover and the rear wheels, and a second mode of operation, in which the prime mover is connected to the rear wheels by the prop shaft, the controller being arranged to cause a transition from the first mode of operation to the second mode of operation when a value of an operating parameter reaches a first threshold value and to cause a transition from the second mode of operation to the first mode of operation when the value of the operating parameter reaches a second threshold value that is different to the first threshold value.

* * * * *